No. 657,516. Patented Sept. 11, 1900.
C. J. COLEMAN.
MOTOR VEHICLE.
(Application filed Oct. 27, 1899.)
(No Model.)
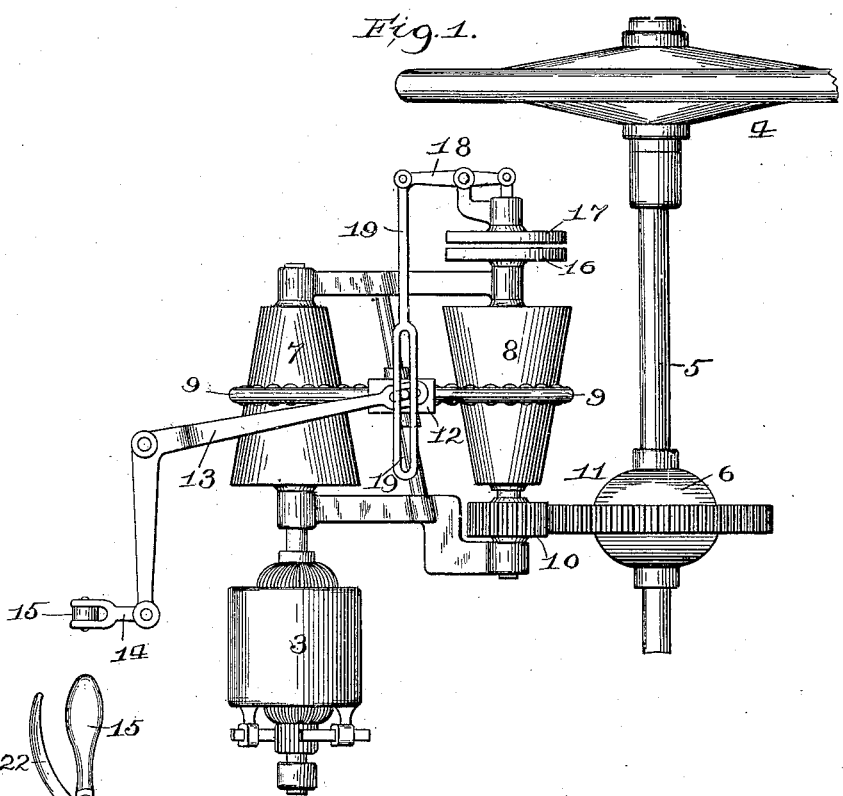
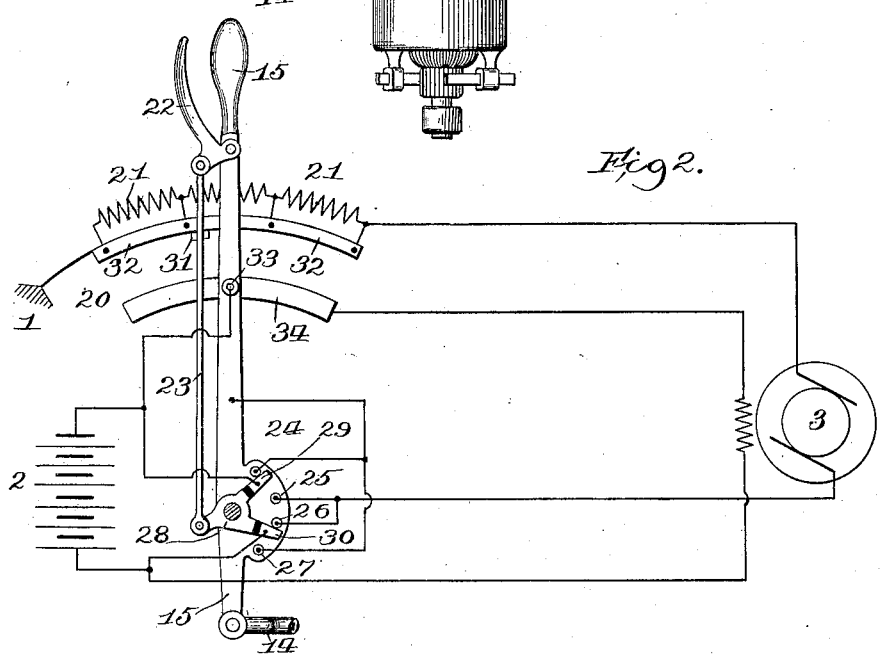
Attest:
Harry D. L. White
R. White.
Inventor:
Clyde J. Coleman,
By Robert Burns, Attorney.
THE NORRIS PETERS CO., PHOTO-LITHO., WASHINGTON, D. C.

UNITED STATES PATENT OFFICE.

CLYDE J. COLEMAN, OF CHICAGO, ILLINOIS, ASSIGNOR, BY MESNE ASSIGN-
MENTS, TO THE GENERAL AUTOMOBILE COMPANY, OF NEW JERSEY.

MOTOR-VEHICLE.

SPECIFICATION forming part of Letters Patent No. 657,516, dated September 11, 1900.

Application filed October 27, 1899. Serial No. 734,970. (No model.)

*To all whom it may concern:*

Be it known that I, CLYDE J. COLEMAN, a citizen of the United States, and a resident of Chicago, in the county of Cook and State of Illinois, have invented certain new and useful Improvements in Motor-Vehicles, (Case No. 7;) and I do hereby declare the following to be a full, clear, and exact description of the same, reference being had to the accompanying drawings, forming a part of this specification.

The present invention relates to that class of motor-vehicles in which an electric motor affords the propelling power, and more especially relates to the manually-actuated mechanism by which the driving mechanism of the vehicle is regulated and controlled.

The present improvement has for its objects, first, to provide a simple and efficient combination of the current-reversing means and the speed-regulating means, the connection being such that the manually-actuated movable member of the current-reverser is adapted to operate the speed-regulating means and in which the electromotive current of the electric motor can only be reversed when the torque of the motor is at its minimum; second, to provide in connection with the coacting current-reversing and speed-regulating mechanisms above described a brake mechanism and operative connections between the same and the speed-regulating mechanism that is adapted to render such brake mechanism active when the torque is the least upon the electric motor, and, third, to provide in connection with such coacting current-reversing and speed-regulating mechanisms of a variable resistance or current-controller coacting with the above-mentioned mechanisms and adapted to vary and control the motor-circuit, all as will hereinafter more fully appear and be more particularly pointed out in the claims.

In the accompanying drawings, illustrative of the present invention, Figure 1 is a fragmentary bottom plan of the driving mechanism of a motor-vehicle embodying the present improvements; Fig. 2, a fragmentary longitudinal sectional elevation illustrating the current reversing and controlling mechanism and diagrammatically the arrangement of the operating electrical circuits, motor, &c.

Similar numerals of reference indicate like parts in the several views.

Referring to the drawings, 1 represents a part of the seat portion of a motor-vehicle; 2, the storage battery or other source of electric power; 3, the electric motor by which the vehicle is impelled; 4, one of the rear driving-wheels; 5, the axle of such driving-wheels, and 6 the casing of the equalizing-gear usual to power-driven vehicles.

7 and 8 represent a pair of coned pulleys connected together by a shiftable belt 9 and constituting the variable connecting gearing mechanism of the present invention between the electric motor 3 and the axle 5 of the driving-wheels of the vehicle, and to this end the coned pulley 7 will be connected to the shaft of the motor 3, as shown, while the coned pulley 8 will be connected by the pinion 10 and gear-wheel 11 with the casing 6 of the equalizing-gear upon the rear or driving axle 5.

12 is the sliding belt-shifter engaging in the usual manner the belt 9 and receiving positive motion in either direction from a bell-crank lever 13, that in turn has operative connection by link 14 with the lower end or arm of the movable member or lever 15 of the current controlling and reversing mechanism, hereinafted described, in order that the shifting of such belt in one direction or the other will be in unison with the movement of the movable member of the current controlling and reversing mechanism.

16 is a brake-disk carried by the shaft of the coned pulley 8 and rotating therewith. 17 is a secondary brake-disk made non-rotatable in its support, but capable of longitudinal movement upon its axis to or from the disk 16 to perform a braking action upon the same or release such disk from such braking action.

18 is a lever, one end of which is attached to the shaft of the brake-disk 17, while the other end has operative connection by means of a slotted link 19 with the sliding belt-shifter 12, the connection being such that the braking action will only be effected when the belt connection 9 is at the smallest diameter of the coned pulley 7, in that with such position of the parts the operating lever or member 15 of the current-controlling mechanism will be at or near the extreme limit of its off position, with the motor-circuit broken.

20 is the stationary member of the current-controller, formed with a series of insulated contact-sections, as usual, to which the coils of the rheostat or variable resistance 21 are connected in series and are adapted in the shifting movement of the movable member or lever 15 to introduce a variable resistance into the motive circuit or to wholly break the same, as usual in this type of electrical appliances.

In cases where an arrangement of batteries is relied upon to afford a variable electromotive force or current to the motor such batteries will be connected to said circuit-controllers in the usual well-known manner, so as to be capable of being used in series or in series multiple at the will of the operator, and accordingly the term "current-controller" in the present description is intended to cover a means for controlling in a variable manner the electromotive force of the electrical circuit of the vehicle-motor, regardless of the particular arrangement and connections of such circuit and regardless of the fact that the circuit to the field or to the armature is the circuit which is reversed in effecting a reversal of the motor.

One part of the present invention involves, broadly, the combination of a current-reversing switch and a variable-speed mechanism, coacting together and operating in unison, and in a more-restricted sense involves the combination, with such mechanism, of a current-controlling mechanism, also coactingly connected and operating in unison.

In the attainment of the above results or functions an auxiliary means capable of independent actuation is attached to the operating-handle of the movable member or lever 15 of the current-controller and having operative link or other equivalent connection with the current-reversing switch. In the particular construction shown in Fig. 2 of the drawings, as illustrative of one means of carrying out this part of the present invention, a bell-crank handle or lever 22 is pivoted to the lever 15 near its upper or grip end, so as to be capable of operation by the hand of the operator that manipulates the said current-controller lever 15.

23 is a link connection extending from the short arm of the lever 22 to the reversing-switch mechanism to constitute an operative connection between the two. Any other equivalent mechanism for attaining such movement of the link connection 23 may, however, be employed without departing from the spirit of this part of the present invention.

The current-reversing switch mechanism above referred to may comprise any usual type of reversing mechanism common to the electrical art. Such switch will, however, preferably comprise opposed pairs of insulated contacts 24 25 and 26 27, arranged concentric with the pivot-axis of the operating-lever 15 of the current-controller and moving in unison with said lever as the position of the latter is changed and an oscillating member 28, pivoted on a common axis with that of the operating-lever 15 and adapted to have movement independent of said lever. Such independently-movable member 28 is provided with a pair of insulated contact pieces or fingers 29 30, adapted to alternately contact with the opposed pairs of insulated contacts 24 25 and 26 27. Such movable member is operatively connected to the link 23, as heretofore described.

Another part of the present invention involves means whereby the variable gearing connection of the driving-motor will be in that position in which a minimum torque or load is on the motor and preferably with the motive circuit broken before a movement of the current-reversing switch can be effected to attain a reversal of the motor, the purpose being to prevent any liability of a burning of the motor-windings due to a reversal of the current with a maximum load or torque upon the motor.

In the mechanism shown in the accompanying drawings for effecting the above result 31 is a laterally-projecting pin or stud on the link connection 23, adapted to engage either the upper or lower surface of the segmental confining-bar 32 to hold the current-reversing mechanism in either of its positions in a positive manner, the construction being such that the locking-stud 31 can only be shifted from the top to the bottom surface of the confining-bar 32 and, vice versa, when the operating-lever 15 of the current-controller is in an open or starting position.

In the present invention the operating-lever 15 is capable of an additional movement past the point at which it breaks current communication with the variable resistance 21, and in the present improvement the connections are such that such additional movement of the lever 15 is employed to effect the braking action of the driving mechanism heretofore described.

33 is an insulated contact-piece carried by the operating-lever 15 of the current-controller and connected with one pole of the battery.

34 is a fixed segmental contact-plate connected through the field of the motor with the other pole of the battery. Said contact-plate 33 and contact-plate 34 are adapted to maintain the current upon the field of the motor at all times except when the current-controller has broken the circuit to the armature of the motor, when the circuit to the field will be simultaneously broken and again reëstablished with the reëstablishment of the armature-circuit.

Having thus fully described my said inven- tion, what I claim as new, and desire to secure by Letters Patent, is—

1. In a system of electrical propulsion for motor-vehicles, the combination of a circuit-controller, a current-reversing switch, a motor, a variable-speed mechanism, intermediate connections between the same and the actuating means of the controller, and means capable of independent actuation carried by the movable member of the controller within easy reach of the operator's hand and having operative connection with said switch, substantially as set forth.

2. In a system of electrical propulsion for motor-vehicles, the combination of a circuit-controller, a current-reversing switch, a motor, a variable-speed mechanism, intermediate connections between the same and the actuating means of the controller, means capable of independent actuation carried by the movable member of the controller within easy reach of the operator's hand and having operative connection with said switch, and means for locking said switch against movement except when the controller mechanism is in its starting position, substantially as set forth.

3. In a system of electrical propulsion for motor-vehicles, the combination of a circuit-controller, a current-reversing switch, a motor, a variable-speed mechanism, intermediate connections between the same and the actuating means of the controller, means capable of independent actuation carried by the movable member of the controller within easy reach of the operator's hand, the same comprising a bell-crank handle having operative link connection with the movable member of the reversing-switch, substantially as set forth.

4. In a system of electrical propulsion for motor-vehicles the combination of a circuit-controller, a current-reversing switch, a motor, a variable-speed mechanism, intermediate connections between the same and the actuating means of the controller, means capable of independent actuation carried by the movable member of the controller within easy reach of the operator's hand and having operative connection with said switch, and means for locking said switch against movement except when the controller mechanism is in its starting position, the same comprising a laterally-projecting pin on the switch-operating connection, and a confining-bar adapted to be engaged by said lateral pin to prevent a shifting of the switch except when the pin is moved out of engagement with said bar, substantially as set forth.

5. In a system of electrical propulsion for motor-vehicles, the combination of a circuit-controller, a current-reversing switch, comprising a fixed and movable member arranged concentric with the pivot-axis of the controller, a motor, a variable-speed mechanism, intermediate connections between the same and the actuating means of the controller, and means capable of independent actuation carried by the movable member of the controller within easy reach of the operator's hand and having operative connection with said switch, substantially as set forth.

6. In a system of electrical propulsion for motor-vehicles, the combination of a circuit-controller, a current-reversing switch comprising a fixed and movable member arranged concentric with the pivot-axis of the controller, a motor, a variable-speed mechanism, intermediate connections between the same and the actuating means of the controller, means capable of independent actuation carried by the movable member of the controller within easy reach of the operator's hand and having operative connection with said switch, and means for locking said switch against movement except when the controller mechanism is in its starting position, substantially as set forth.

7. In a system of electrical propulsion for motor-vehicles, the combination of a circuit-controller, a current-reversing switch comprising a fixed and movable member arranged concentric with the pivot-axis of the controller, a motor, a variable-speed mechanism, intermediate connections between the same and the actuating means of the controller, means capable of independent actuation carried by the movable member of the controller within easy reach of the operator's hand and having operative connection with said switch, and means for locking said switch against movement except when the controller mechanism is in its starting position, the same comprising a laterally-projecting pin on the switch-operating connection, and a confining-bar adapted to be engaged by said lateral pin to prevent a shifting of the switch except when the pin is moved out of engagement with said bar, substantially as set forth.

8. In a system of electrical propulsion for motor-vehicles, the combination of a current-reversing switch, means for actuating the same, a motor, a variable-speed mechanism, intermediate connections between the same and the actuating means of the switch, and a brake mechanism having intermittent operative connection with the variable-speed mechanism, substantially as set forth.

9. In a system of electrical propulsion for motor-vehicles, the combination of a circuit-controller, a current-reversing switch, a motor, a variable-speed mechanism, intermediate connections between the same and the actuating means of the controller, and a brake mechanism receiving motion from the movable member of the current-controller, and adapted to be actively operated by a continued movement of such movable member past the point where it effects an interruption of the motor-circuit, substantially as set forth.

10. In a system of electrical propulsion for motor-vehicles, the combination of a circuit-controller, a current-reversing switch, a motor, a variable-speed mechanism, intermediate connections between the same and the actuating means of the controller, a brake mechanism receiving motion from the movable member of the current-controller and adapted to be actively operated by a continued movement of such movable member past the point where it effects an interruption of the motor-circuit, and means for insuring the return of the movable member to its starting-point before a reversal of the motive current can be effected, substantially as set forth.

In testimony whereof witness my hand this 6th day of September, 1899.

CLYDE J. COLEMAN.

In presence of—
ROBERT BURNS,
H. A. NOTT.